United States Patent [19]

Kirk

[11] Patent Number: 5,023,095

[45] Date of Patent: Jun. 11, 1991

[54] COLOR STABILIZATION SYSTEM FOR BETA-CAROTENE IN DRY FOOD MIXES

[75] Inventor: Paula S. Kirk, Dearborn Heights, Mich.

[73] Assignee: BASF Corporation, Parsippany, N.J.

[21] Appl. No.: 535,074

[22] Filed: Jun. 8, 1990

[51] Int. Cl.$^5$ ............................................. A23L 1/275
[52] U.S. Cl. .................................. 426/250; 426/540; 426/72
[58] Field of Search .......................... 426/250, 540, 72

[56] References Cited

U.S. PATENT DOCUMENTS

| | | | |
|---|---|---|---|
| 4,316,917 | 2/1982 | Antoshkiw et al. | 426/250 |
| 4,504,499 | 3/1985 | Finnan | 426/250 |
| 4,585,655 | 4/1986 | Sherbanenko | 426/250 |
| 4,913,915 | 4/1990 | Tanaka | 426/250 |

Primary Examiner—Jeanette Hunter

[57] ABSTRACT

A color-stabilized food coloring composition is disclosed. The composition contains beta-carotene dispersions, at least one edible oil and dl-alpha-tocopherol. When applied to a dry food substrate, the composition has enhanced color stability. Also disclosed are coated substrates and a method of coating substrates with the color-stabilized food coloring compositions.

15 Claims, 2 Drawing Sheets

COLOR STABILIZATION SYSTEM FOR BETA-CAROTENE IN DRY FOOD MIXES

TECHNICAL FIELD

The field of art to which this invention pertains is food color compositions.

BACKGROUND OF THE INVENTION

Beta-carotene is typically used in food products as a coloring agent. The coloring of food products enhances the perception of such products as appealing to consumers. However, it is known that beta-carotene is degraded through oxidation with consequent loss of its coloring properties. Antioxidants are often combined with beta-carotene to counteract this degradation for a period of time commensurate with the shelf life of the food products.

The antioxidants effective for oil or fat-based foods are typically different than antioxidants used for water-based, or very high moisture content foods. The antioxidants approved in the United States for use in foods include, among others, ascorbic acid, ascorbyl palmitate, BHA, BHT, citric acid, EDTA, erythorbic acid, gum guaiac, lecithin, phosphates, propyl gallate, sulfites, tocopherols, glucose oxidase, dilauryl thiodi-propionate, THBP or 2,4,5-trihydroxybutyrophenone, and TBHQ or 4-hydroxymethyl-2, di-tert-butylphenol.

Choice of an antioxidant in an oil or fat-based system depends on several factors including the desired function, dispersibility, storage conditions, and possible imparted flavor.

Ascorbyl palmitate and/or dl-alpha-tocopherol have been specifically used to stabilize foods colored with oil dispersions of synthetic beta-carotene, especially in colored oils. Examples of these combinations are disclosed in Cort, WM 1974, J AM Oil Chem Soc: 51; 321, and, U.S. Pat. No. 4,504,499.

Oil-dispersible beta-carotene is not typically used in dry food mixes because water soluble forms are easier to handle. However, production constraints may not allow for the incorporation of powdered beta-carotene in dry or wet blending operations. When using dry mixes, oil-soluble beta-carotene may have to be adsorbed onto one of the dry ingredients, thus imparting concentrated color. Typically, powders consisting of finely divided particles such as sucrose, glucose, or extra fine powders are used as an adsorbate. Herein all discussions refer to the use of the oil-dispersions of beta-carotene.

When adsorbed onto a dry ingredient, beta-carotene is typically distributed over the surface of the particles of the dry ingredient thus exposing a large cumulative surface area to oxygen and light. This typically results in increased degradation of the beta-carotene causing color loss.

In order to prevent the degradation and resulting color loss of the beta-carotene, it is typically necessary to add an antioxidant. An antioxidant of choice is a tocopherol such as dl-alpha-tocopherol since the tocopherols are naturally occurring substances. However, it is known in this art that tocopherols are not recognized as having good antioxidant properties, especially when used as the only antioxidant.

Much of the literature states that tocopherols have a weak to moderate antioxidant effect (Reinton, R. J Food Sci 1981: 46; 970), and that in fact, gamma-tocopherol may be more effective than alpha-tocopherol (Sherwin, ER, J Am Oil Chem Soc. 1976: 53; 430).

Cort (Am Oil Chem Soc, 1974: 51; 321) explains that above 0.02% in animal fats tocopherols are not effective antioxidants. Added tocopherols used to stabilize vegetable oils are not very effective at preventing rancidity because of residual natural tocopherols in the oil. It has been found that ascorbyl palmitate used as an antioxidant in vegetable oils is much more effective singly, as well as synergistically, with tocopherols, than the use of tocopherol alone.

What is needed in this art are food coloring compositions containing beta-carotene which have improved color stability.

DISCLOSURE OF THE INVENTION

A color-stabilized food coloring composition for dry food compositions is disclosed. The composition comprises about 0.5 wt. % to about 5.0 wt. % of beta-carotene, about 0.5 wt. % to about 5.0 wt. % of at least one edible oil, and about 0.05 wt. % to about 1.5 wt. % of dl-alpha-tocopherol. The composition when used as a food coloring has, surprisingly and unexpectedly, enhanced color stability.

Another aspect of the present invention is a substrate coated with a color-stabilized food coloring composition. The substrate comprises a dry food composition. The color-stabilized food coloring composition comprises about 0.5 wt. % to about 5.0 wt. % of beta-carotene, about 0.5 wt. % to about 5.0 wt. % of at least one edible oil and about 0.05 wt. % to about 1.5 wt. % of dl-alpha-tocopherol. The coated substrate has enhanced color stability.

Yet another aspect of the present invention is a method of coloring a dry food composition to produce a color-stabilized food composition. The method comprises applying a color-stabilized food coloring composition to the dry food composition and then incorporating the coated dry food composition into the food composition. The food coloring composition comprises about 0.5 wt. % to about 5.0 wt. % of beta-carotene, about 0.5 wt. % to about 5.0 wt. % of at least one edible oil, and about 0.05 wt. % to about 1.5 wt. % of dl-alpha-tocopherol. The resulting colored food composition has enhanced color stability.

The foregoing and other features and advantages of the present invention will become more apparent from the following description.

BEST MODE FOR CARRYING OUT THE INVENTION

Figure 1:
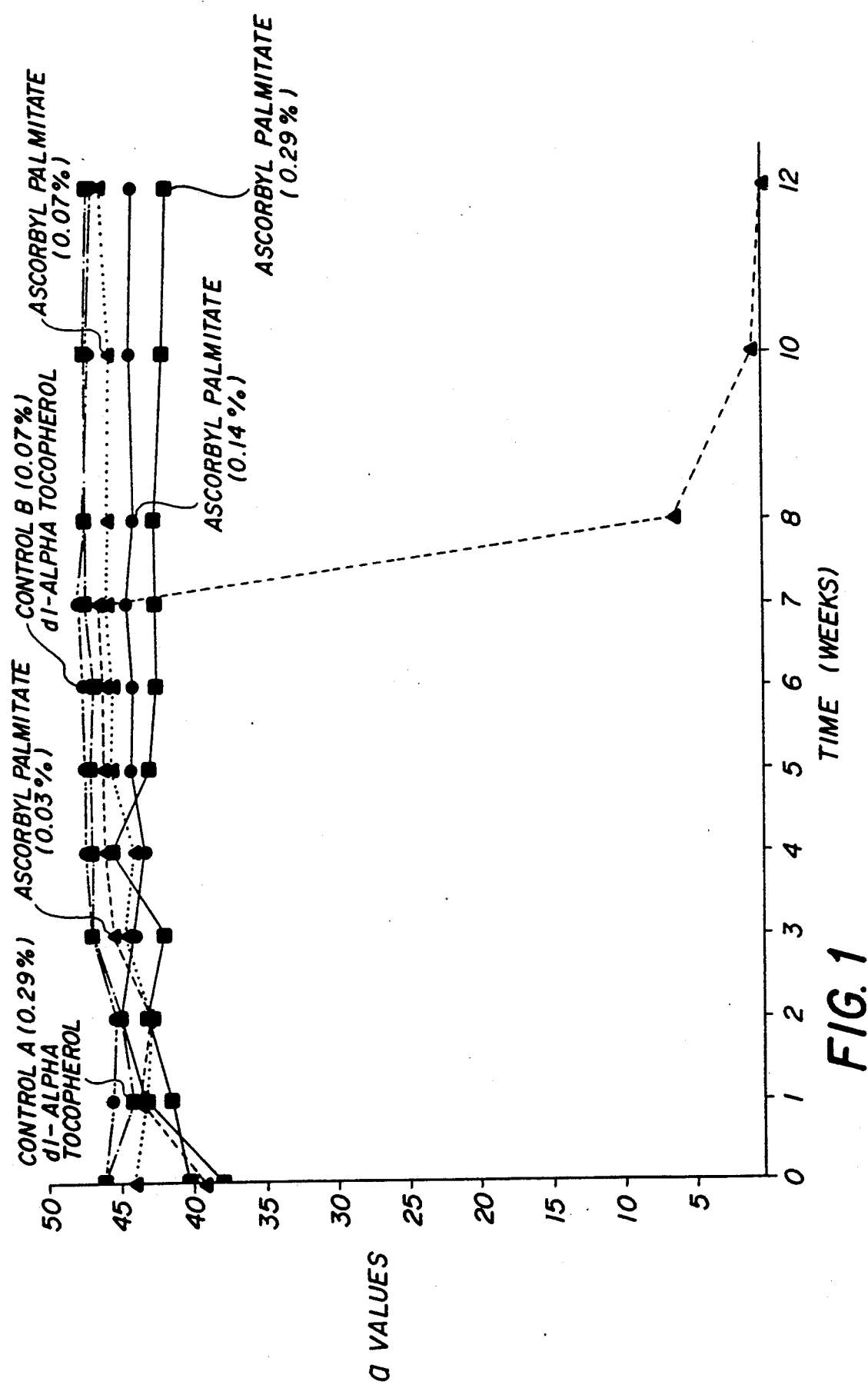
FIG. 1 - is a graph of data illustrating the color stability of beta carotene on sucrose with ascorbyl palmitate.

Carotene which has the chemical formula $C_{40}H_{56}$ is a precursor of Vitamin A occurring naturally in plants. There are three isomers of carotene. The beta isomer being the most prevalent. Beta-carotene is a naturally occurring pigment and is a member of a class of pigments called carotenoids. The molecular structure of carotene is similar to that of Vitamin A. The beta-carotene molecule is cleaved to form two Vitamin A molecules in the liver of humans. Beta-carotene is typically derived by extraction from plant sources such as algae.

The extraction processes utilized are well known in the art. Beta-carotene may also be synthesized in accordance with known chemical processes such as that which is disclosed in U.S. Pat. No. 4,504,499. Beta-carotene is easily degraded when subjected to air, ultraviolet light, or high temperatures. As a result, beta-carotene is typically sold in a stabilized form for applications where the beta-carotene will be subjected to adverse conditions such as high temperature and the like in order to prolong or stabilize the color. U.S. Pat. No. 4,504,499 discloses processes for heat stabilizing carotenoid-containing edible oils. The disclosure of this patent is incorporated by reference herein. Beta-carotene is readily available from several commercial sources. However, synthetic beta-carotene is available from only two sources: BASF Corporation and Hoffman-LaRoche, Nutley, N.J. It is particularly preferred in the practice of the present invention to use synthetic 22% Heat Stabilized Beta-Carotene oil dispersion available from BASF Corporation, Parsippany, N.J., or a 30% beta-carotene oil dispersion.

The edible oils which are useful in the practice of the present invention include vegetable edible oils which are readily available and typically used in foods such as coconut oil, palm oil, olive oil, peanut oil, and sesame oil. Particularly preferred are oils such as cottonseed, sunflower, corn, safflower, canola, and soybean oil. The oils may be used singly or in combinations. The oils will typically contain high amounts of polyunsaturated fatty acids.

Although any antioxidants approved for use in foods may be used in the color-stabilized food coloring compositions of the present invention, including propyl gallate, ascorbyl palmitate, BHA, BHT, and ascorbic acid; it is particularly preferred to use the tocopherols as an antioxidant, in particular, dl-alpha-tocopherol. The tocopherols are commonly referred to as Vitamin E alcohol. The isomers which comprise Vitamin E alcohol are the alpha, beta, gamma, and delta forms. The acetate form of Vitamin E does not function as an antioxidant in food systems. Vitamin E occurs naturally in plants. It is found in such sources as wheat germ, vegetable oils, soybeans, and whole grains. It is typically derived from the plant sources by extraction processes which are known in the art. Tocopherols may also be synthesized using processes known in the art. It is particularly preferred in the practice of the present invention to use dl-alpha-tocopherol as an antioxidant in the color-stabilized food colorings. In particular, synthetically manufactured dl-alpha-tocopherol is preferred.

The dry food compositions which will be used as the substrates onto which the color-stabilized food coloring compositions of the present invention will be adsorbed typically will consist of dry food ingredients. The mixes will typically contain several ingredients such as flour, salt, modified food starch, food starch, sugars such as maltodextrin, fructose, sorbitol, mannitol, saccharin, xylitol, aspartame, and the like. The dry mixes will typically be in a powder or particulate form. Particle sizes will range typically from about 100 microns up to about 700 microns. However, the dry food compositions or substrates do not have to be in a powder or particulate form but may be in the form of sheets, cakes, wafers, chunks, pieces, and the like, as long as the surfaces can be uniformly coated by spraying. In addition to mixes, the coloring compositions may be applied to dry ingredients such as those previously mentioned, either alone or in combinations.

The color-stabilized food coloring compositions of the present invention will typically comprise about 0.5 wt. % to about 5.0 wt. % of beta-carotene, more typically about 1.0 wt. % to about 5.0 wt. %, and preferably about 2.9 wt. % to about 3.1 wt. %. Sufficient amounts of beta-carotene will be incorporated into these compositions to produce the desired color characteristics, which it will be understood by those skilled in the art will vary by product.

Sufficient amounts of at least one edible oil will be included in the food coloring compositions of the present invention in order to aid in the dispersion of the oil soluble dl-alpha-tocopherol and beta-carotene. Typically, the amount of edible oil will comprise about 1.0 wt. % to about 3.0 wt. % of the coloring composition; more typically about 2.0 wt. % to about 4.0 wt. %. It is preferred that the coloring compositions comprise about 2.9 wt. % to about 3.0 wt. % of the edible oil. As previously mentioned, the edible oil may consist of a single edible oil, such as soybean oil, or a blend of two or more edible oils.

Sufficient quantities of dl-alpha-tocopherol will be included in the color-stabilized food coloring compositions of the present invention to produce the desired stabilizing effect. Typically about 0.05 wt. % to about 1.5 wt. % of the dl-alpha-tocopherol is included; more typically about 0.1 wt. % to about 0.5 wt. %. It is preferred to utilize about 0.29 wt. % to about 0.31 wt. % of dl-alpha-tocopherol in the color-stabilized food coloring compositions of the present invention.

The color-stabilized food coloring compositions of the present invention are typically manufactured in the following manner. Beta-carotene and vegatable oil are combined in a conventional mixing vessel and mixed for a sufficient amount of time to obtain a uniform dispersion. Then, dl-alpha-tocopherol is added to the dispersion and mixed for a sufficient amount of time to get a uniform composition.

According to the process of the present invention, dry foods are colored with the color-stabilized food coloring compositions of the present invention by adsorbing the food coloring compositions onto the particles that make up a dry food mix. In addition, one or more of the components of a dry food mix may be coated and this admixed with the uncoated components of the mixture. The dry food mix or component is then processed into a conventional food item such as cake, bread, donuts, muffins, pastries, cookies, and frostings and fillings. The processes which may be used to color the dry food mixes include any process typically utilized in the food or pharmaceutical industries wherein a liquid colorant is mixed with a dry composition in order to blend liquid into the dry composition. Typical processes include maximum shear mixing as with a rotary blade blender or whisk. The color-stabilized food coloring compositions can be applied to a dry food mix or a component thereof by spraying. It should be noted that as used herein the terms ingredient and component are interchangeable. A preferred process consists of initially placing the dry ingredients or dry mix in a deep mixing bowl. Then a "well" or cavity is formed in the dry ingredients. Next, a sufficient amount of the color-stabilized food coloring composition of the present invention is added to the well. The dry ingredients and food coloring composition are mixed for a sufficient amount of time to obtain a uniform coating of the ingredients (substrates). A suitable mixing means is used such as a HOBART mixer with a whisk attachment. The resulting colored ingredients will be stored preferably in a sealed container with minimum head space until its use in a complete food product. It will be appreciated by those skilled in the art that the process of the present invention may be carried out with a single dry ingredient which is then mixed with other ingredients. The resulting mix is then used to manufacture food product.

The color stability of food colorings is typically measured by using an automated tristimulus colorimeter to measure the "redness" of the beta-carotene adsorbed onto the dry adsorbant. The instrumentation which is preferred is a Hunter Lab Colorimeter manufactured by Hunter Associates, Reston, Va. Color difference is measured over time at ambient storage conditions.

The following examples are illustrative of the principals and practices of this invention, although not limited thereto. Parts and percentages were used for parts and percentages by weight.

EXAMPLE 1

A color-stabilized food coloring composition was prepared in accordance with the following formulation:

| Ingredient | Amounts |
|---|---|
| 22.0% heat stabilized beta-carotene dispersion (1) | 3.0 grams |
| dl-alpha-tocopherol (2) | 0.6 grams |
| sucrose | 200.0 grams |
| soy bean oil | 3.0 grams |
| Total | 206.6 grams |

(1) Manufactured by BASF Corporation
(2) Manufactured by BASF Corporation

The heat stabilized beta-carotene was prepared in accordance with the process of U.S. Pat. No. 4,504,499. The food coloring composition was prepared by combining the above-mentioned ingredients in a conventional mixing vessel and mixing until a uniform dispersion was obtained.

EXAMPLE 2

A color-stabilized food coloring composition was prepared in accordance with the method of Example 1. The composition had the following formulation:

| Ingredient | Amounts |
|---|---|
| 30% beta-carotene dispersion (1) | 2.4 grams |
| dl-alpha-tocopherol (2) | 0.6 grams |
| sucrose | 200.0 grams |
| soy bean oil | 3.0 grams |
| Total | 206.0 grams |

(1) Manufactured by BASF Corporation
(2) Manufactured by BASF Corporation

EXAMPLE 3

The food coloring compositions of Examples 1 and 2 were applied to a dry food composition in the following manner. Powdered sucrose was placed in a conventional vessel. A "well" (cavity) was formed in the sucrose and the color-stabilized food coloring of Example 1 was poured into the cavity. The sucrose and coloring were mixed with a HOBART mixer for about 6 to about 10 minutes until all of the color composition had been uniformly adsorbed onto the sucrose. The color-stabilized food coloring of Example 1 was adsorbed onto the surfaces of the sucrose particles, or substrates, in a uniform manner to provide desired coloring characteristics.

The color-stabilized food coloring of Example 2 was applied to sucrose in a similar manner with similar results.

EXAMPLE 4

Both 30% beta-carotene and 22% heat stabilized beta-carotene (BASF) dispersions were diluted in soybean oil and used with varying levels of dl-alpha-tocopherol.

Another experimental sample set was made up without the soybean oil diluent to compare stability.

All samples were measured for color using the HUNTER tristimulus colorimeter, model D-25 (Hunter Assoc. Inc., Reston, Va.). Color was measured using the L a b scale.

Color difference or color stability was measured every 2 weeks for the first month and at months 2, 6, 8, 10 and 12.

All samples were stored in opaque plastic jars sealed with about 1/5 of the internal volume as head space. They were stored in ambient conditions. No nitrogen flushing was used to slow beta-carotene oxidation. (Nitrogen an inert gas displaces oxygen and stalls oxidation.)

Samples mixed without soybean oil faded to very light yellow by the sixth month. The vegetable oil appeared to act as an oxygen barrier for the beta-carotene and without it degradation occurred rapidly even with the dl-alpha-tocopherol. Vegetable oil also functions as a diluent for the tocopherol, creating greater dispersion media volume to ensure adequate coverage.

Dl-alpha-tocopherol at 0.07% with 22% heat stabilized beta-carotene demonstrated a dramatic drop in color stability, orange to white between months 6 and 8, e.g., 7 months. At the same level of tocopherol (0.07%) using 30% beta-carotene the drop off of color from orange to white occurred at month 4.

At concentrations twice as high (dl-alpha-tocopherol @ 0.15%) stability was increased from 7 months to 10.5–11 months. At 0.29% tocopherol, color stability at 8 months had barely decreased color from initial baseline readings for either 30% or 22% heat stabilized beta-carotene samples. A dramatic color loss occurs about the twelfth month at this level of tocopherol.

Ascorbyl palmitate at the same concentrations used as the only antioxidant with either 22% heat stabilized beta-carotene or 30% beta-carotene did not exhibit nearly the color stability as the tocopherol.

Figure 2:
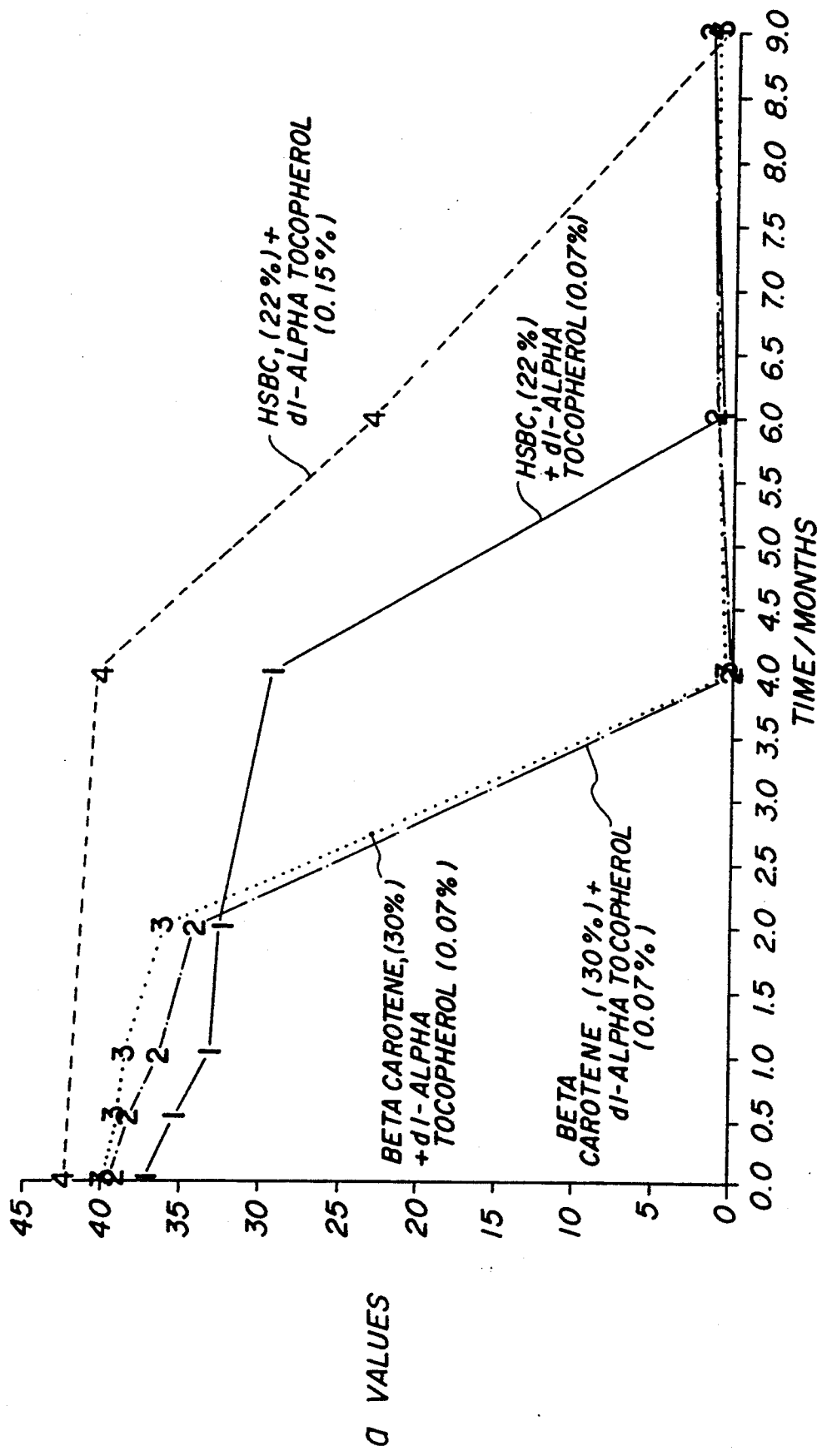
FIG. 2 - is a graph of data illustrating the color stability of beta-carotene on sucrose plus dl-alpha-tocopherol.

The test results described herein are illustrated in FIG. 1 and FIG. 2.

The highest level of ascorbyl palmitate (0.29%) had no color retention by month 5 (i.e., white sample), as compared to the stability of the same level of dl-alpha-tocopherol.

All lower concentrations of ascorbyl palmitate faded considerably earlier: 0.03% @ 1.2 months; 0.07% @ 2.5 months; 0.14% @ 4 months.

The color-stabilized food coloring compositions of the present invention, suprisingly and unexpectedly, exhibit improved color stability. This improved color stability is obtained by using higher concentrations of tocopherols to produce an antioxidative effect rather than the expected pro-oxidative effect as described in the literature. It is now possible to utilize liquid, oil-based beta-carotene compositions to color dry food compositions and obtain improved color stability where product constraints do not allow for the use of dry beta-carotene or water miscible certified food colors.

Although this invention has been shown and described with respect to detailed embodiments thereof, it will be understood by those skilled in the art that various changes in form and detail thereof may be made without departing from the spirit and scope of the claimed invention.

I claim:

1. A color-stabilized food coloring composition for dry food compositions comprising:
   about 0.5 wt. % to about 5.0 wt. % of beta-carotene;
   about 0.5 wt. % to about 5.0 wt. % of at least one edible oil; and
   about 0.05 wt. % to about 1.5 wt. % of dl-alpha-tocopherol,
   the composition, when used as a food coloring, has enhanced color stability.

2. The food coloring composition of claim 1 wherein the at least one edible oil comprises soybean oil.

3. The food coloring composition of claim 1 wherein the beta-carotene comprises 22% heat stabilized beta-carotene dispersion.

4. The food coloring composition of claim 1 wherein the amount of beta-carotene comprises about 2.9 wt. % to about 3.1 wt. %.

5. The food coloring composition of claim 1 wherein the amount of dl-alpha-tocopherol comprises 0.29 wt. % to about 0.31 wt. %.

6. A substrate coated with a color-stabilized food coloring composition, said substrate comprising a dry food composition, wherein the color-stabilized food coloring composition comprises:
   about 0.5 wt. % to about 5.0 wt. % of beta-carotene;
   about 0.5 wt. % to about 5.0 wt. % of at least one edible oil; and
   about 0.05 wt. % to about 1.5 wt. % of dl-alpha-tocopherol,
   the coated substrate having enhanced color stability.

7. The coated substrate of claim 6 wherein the at least one edible oil comprises soybean oil.

8. The coated substrate of claim 6 wherein the beta-carotene comprises 22% heat stabilized beta-carotene dispersion.

9. The coated substrate of claim 6 wherein the amount of beta-carotene comprises about 2.9 wt. % to about 3.1 wt. %.

10. The coated substrate of claim 6 wherein the amount of dl-alpha-tocopherol comprises 0.29 wt. % to about 0.31 wt. %.

11. A method of coloring a dry food composition to produce a colored food composition comprising applying a color-stabilized food coloring composition to the dry food composition, the food coloring composition comprising:
    about 0.5 wt. % to about 5.0 wt. % of beta-carotene;
    about 0.5 wt. % to about 5.0 wt. % of at least one edible oil; and
    about 0.05 wt. % to about 1.5 wt. % of dl-alpha-tocopherol,
    and then producing a colored food composition from the colored dry food compositions, the colored food composition having enhanced color stability.

12. The method of claim 11 wherein the at least one edible oil comprises soybean oil.

13. The method of claim 11 wherein the beta-carotene comprises 22% heat stabilized beta-carotene dispersion.

14. The method of claim 11 wherein the amount of beta-carotene comprises about 2.9 wt. % to about 3.1 wt. %.

15. The method of claim 11 wherein the amount of dl-alpha-tocopherol comprises 0.29 wt. % to about 0.31 wt. %.

* * * * *